US 8,728,650 B2

(12) United States Patent
Kim et al.

(10) Patent No.: US 8,728,650 B2
(45) Date of Patent: May 20, 2014

(54) APPARATUS AND METHOD FOR ENHANCING IMPREGNATION WITH ELECTROLYTE IN SECONDARY BATTERY

(71) Applicant: LG Chem, Ltd., Seoul (KR)

(72) Inventors: In-Jung Kim, Daejeon (KR); Jong-Hee Kim, Daejeon (KR); Hyung-Kyu Lim, Daejeon (KR); In-Seok Yang, Namyangju-si (KR); Seok-Jung Park, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/670,041

(22) Filed: Nov. 6, 2012

(65) Prior Publication Data

US 2013/0065111 A1    Mar. 14, 2013

Related U.S. Application Data

(63) Continuation of application No. PCT/KR2011/001996, filed on Mar. 23, 2011.

(30) Foreign Application Priority Data

Sep. 30, 2010  (KR) .................... 10-2010-0095277

(51) Int. Cl.
*H01M 2/00*   (2006.01)
*H01M 6/04*   (2006.01)

(52) U.S. Cl.
USPC .......................... 429/163; 429/188

(58) Field of Classification Search
None
See application file for complete search history.

(56) References Cited

U.S. PATENT DOCUMENTS 6,006,439 A * 12/1999 Del Mercado et al. ........... 34/61

FOREIGN PATENT DOCUMENTS

| JP | 04-28569 A | 10/1992 |
|---|---|---|
| JP | 05-190168 A | 7/1993 |
| JP | 07-326338 A | 12/1995 |
| JP | 7-326338 A | 12/1995 |
| JP | 8-273659 A | 10/1996 |
| JP | 11-265705 A | 9/1999 |
| JP | 2000-340215 A | 12/2000 |
| KR | 1996-0027023 A | 7/1996 |
| KR | 2000-0028858 A | 5/2000 |
| KR | 2001-210310 A | 8/2001 |

OTHER PUBLICATIONS

Komata, Electrolyte Vacuum Impregnation Method and Equipment of Electrolytic Capacitor Element, Apr. 21, 2000, Japanese Patent JP02000114124A, JPO Abstract English translation.*
International Search Report issued in PCT/KR2011/001996, mailed on Oct. 18, 2011.

* cited by examiner

*Primary Examiner* — Patrick Ryan
*Assistant Examiner* — Jose Colucci Rios
(74) *Attorney, Agent, or Firm* — Birch, Stewart, Kolasch & Birch, LLP

(57) ABSTRACT

An apparatus for enhancing impregnation of the electrolyte in a secondary battery includes a tray in which at least one battery cell is received, and an oscillation and rotation unit capable of oscillating and rotating the tray simultaneously.

19 Claims, 3 Drawing Sheets

APPARATUS AND METHOD FOR ENHANCING IMPREGNATION WITH ELECTROLYTE IN SECONDARY BATTERY

CROSS-REFERENCE TO RELATED APPLICATION

This application is a continuation of International Application No. PCT/KR2011/001996 filed Mar. 23, 2011, which claims priority under 35 USC 119(a) to Korean Patent Application No. 10-2010-0095277 filed in Republic of Korea on Sep. 30, 2010, the entire contents of which are incorporated herein by reference.

TECHNICAL FIELD

The present invention relates to an apparatus and method for enhancing impregnation of an electrolyte in a secondary battery, and more particularly, to an apparatus and method for enhancing impregnation of an electrolyte in a secondary battery with an improved structure so that a battery cell into which the electrolyte is completely injected can rotate and oscillate simultaneously.

BACKGROUND ART

Recently, along with the explosively increasing demand for portable electric or electronic devices, the demand for secondary batteries is also rapidly increasing. In particular, lithium secondary batteries attract great attention because of their high storage capacity.

Meanwhile, as environmental problems are becoming a matter of great concern, solutions for global warming are earnestly and consistently discussed. To reduce the use of fossil fuel by vehicles, which is the main culprit of global warming, environmental-friendly electric or hybrid vehicles are becoming highly commercialized. Such electric or hybrid vehicles need large-capacity secondary batteries. Thus, a new approach to ensure the capacity and safety of secondary batteries for electric or hybrid vehicles is needed.

However, as secondary batteries tend to have larger capacities and the electrode plates of the secondary batteries have an increased unit size, the wetting capability with the electrolyte is becoming more important. While a secondary battery is produced, imperfect impregnation of the electrolyte (or imperfect wetting with the electrolyte) deteriorates capacity of the secondary battery. Additionally, the electrodes can become irregular, causing it to become a more serious matter, which makes reactions of the electrodes be concentrated to a local area. In this case, lithium metal is extruded at the local area, which may cause serious problems in relation to the safety of the secondary battery. Moreover, if the electrode plate has an increased size, the time taken for wetting the electrolyte is relatively increased, which deteriorates productivity of secondary batteries. Also, inferior wetting with the electrolyte accelerates degradation of the secondary batteries, resulting in a shortened life span of the secondary battery though other states of the battery are excellent.

DISCLOSURE

Technical Problem

The present invention is designed to solve the problems of the prior art, and therefore it is an object of the present invention to provide an apparatus and method for enhancing impregnation of the electrolyte by an improved structure which increases the life span of secondary batteries and enhances wetting with the electrolyte (or impregnation of the electrolyte) so that the final product of secondary batteries have uniform properties.

Technical Solution

In one aspect, the present invention provides an apparatus for enhancing impregnation of the electrolyte in a secondary battery, which includes a tray in which at least one battery cell is received; and an oscillation and rotation unit capable of oscillating and rotating the tray simultaneously.

Preferably, the oscillation and rotation unit includes: a chamber to which the tray is mounted; an oscillation member installed to the chamber to oscillate the tray with a predetermined oscillation frequency; and a rotation member for rotating the chamber with a predetermined number of rotations.

Preferably, the chamber includes: a body having an opening through which the tray moves into or out of the body; and a cover coupled to the body to cover the opening.

Preferably, the apparatus further includes: a hinge for coupling one end of the cover to the body; and a hook for selectively coupling the other end of the cover to the body.

Preferably, the chamber includes: a cylindrical case; and a plurality of plates installed to the case to ensure a space for the tray to oscillate.

Preferably, as an alternative embodiment, the chamber includes a substantially rectangular parallelepiped body for receiving the tray so as to ensure a space for the tray to oscillate.

Preferably, the rotation member includes: a rotary shaft installed to both ends of the chamber; a support frame for supporting the rotary shaft; and a driving source for rotating the rotary shaft.

Preferably, as an alternative embodiment, the rotation member includes: a rotary shaft installed to a bottom surface of the chamber; and a driving source for rotating the rotary shaft.

Preferably, the driving source has a step motor capable of giving clockwise and counterclockwise rotations.

Preferably, the oscillation member includes at least one oscillator installed to the chamber so that the oscillator adheres closely to the tray.

Preferably, the tray further includes a tray cover for fixing the battery cells.

Preferably, the apparatus further includes a heating member installed to the tray.

Preferably, the heating member includes a plurality of heating wires installed to a base and/or partitions of the tray.

Preferably, the heating member is heated to a temperature ranging from about 40° C. to about 60° C.

In another aspect, the present invention provides a method for enhancing impregnation of the electrolyte in a secondary battery, which includes (a) receiving at least one battery cell, which is sealed after the electrolyte is injected therein, in a tray; (b) receiving the tray in a chamber that is capable of oscillating and rotating; and (c) simultaneously rotating the chamber with a predetermined number of rotations and oscillating the chamber with a predetermined oscillation frequency.

Preferably, the method further includes heating the tray in advance to a predetermined temperature range.

Preferably, in step (c), a rotating direction of the chamber is changeable between clockwise and counterclockwise directions, and a rotating speed of the chamber is controllable.

In another aspect, the present invention provides a secondary battery, produced in accordance with the above method.

Advantageous Effects

The following effects are expected from the apparatus and method for enhancing impregnation of the electrolyte in a secondary battery according to the present invention.

First, due to the simultaneous oscillation and rotation, the battery cells are impregnated within a shorter period with the electrolyte injected into the battery cells, and uniform wetting is ensured over the entire surface of the electrode plates. Thus, when charge/discharge cycles are performed for a secondary battery, uniform electrode reactions may be accompanied over the entire area of the electrode plates.

Second, the process of wetting the electrolyte may be improved by keeping or controlling rotation and/or oscillation conditions of the chamber in an optimal way. The improved wetting allows the capacity of the secondary battery relatively to increase.

Third, it is possible to prevent the occurrence of irregular electrode states in advance, which prevents electrode reactions from being concentrated to a local area. This may improve the safety of the secondary battery.

Fourth, the process time for wetting the electrolyte may be relatively shortened, which results in the improvement of productivity for secondary batteries.

DESCRIPTION OF DRAWINGS

Other objects and aspects of the present invention will become apparent from the following descriptions of embodiments with reference to the accompanying drawings in which.

BEST MODE

Figure 1:
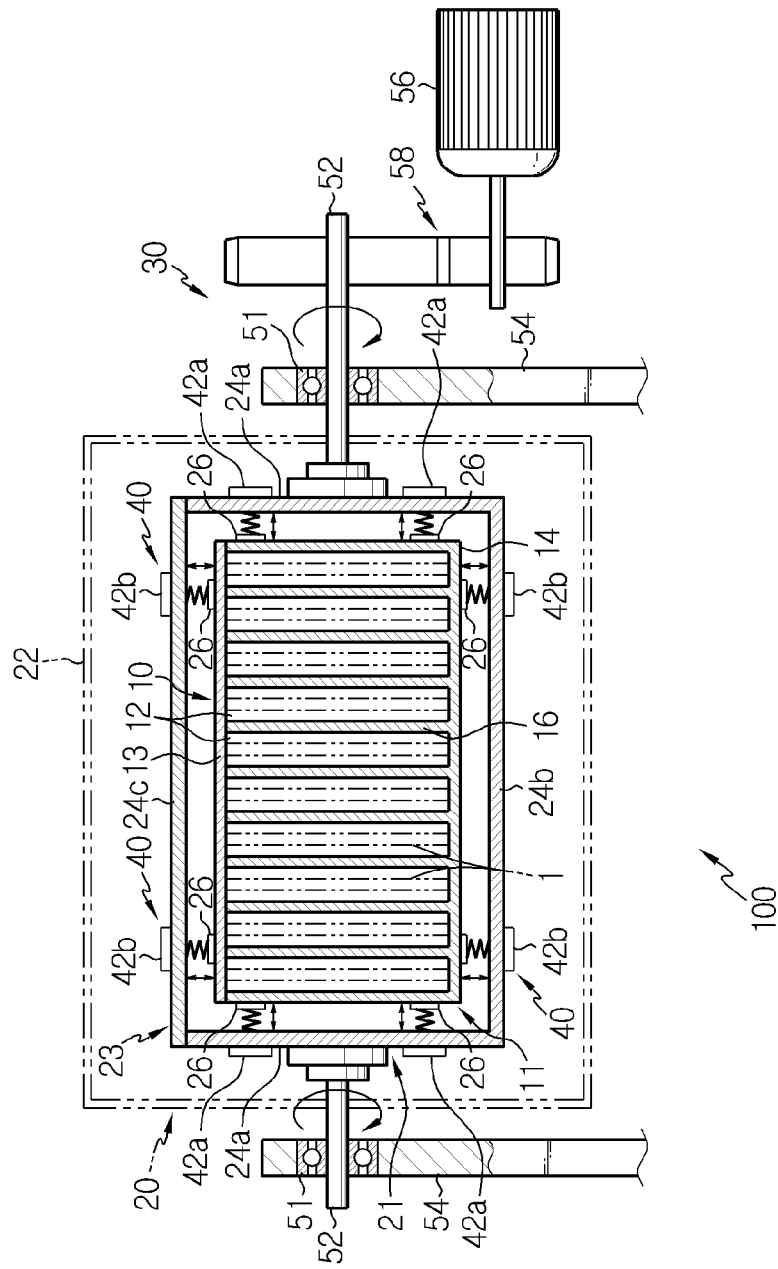
FIG. 1 is a sectional view schematically showing an apparatus for enhancing impregnation of the electrolyte in a secondary battery according to a first embodiment of the present invention.

Terms used in the following detailed description are just for convenience, not for limiting the invention. Terms such as "right", "left", "top surface", and "bottom surface" represent a respective direction in the drawing that it refers to. Terms such as "inward" and "outward" respectively represent a direction oriented to or departing from a geometric center of a respective designated apparatus, system, or member. Terms such as "front", "rear", "upper", and "lower" and relevant words or phrases represent locations and orientations in the drawing that it refers to, and they are not intended to limit the invention. These terms include words listed above, their derivatives and synonyms.

Hereinafter, the apparatus and method for enhancing impregnation of the electrolyte in a secondary battery according to a preferred embodiment of the present invention will be described in detail with reference to the accompanying drawings.

Figure 2:
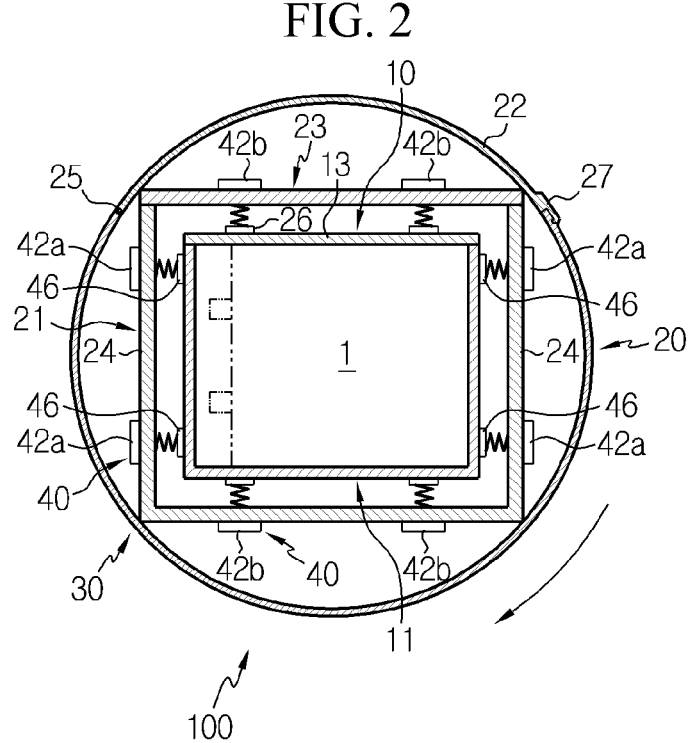
FIG. 2 is a cross-sectional view schematically showing an apparatus for enhancing impregnation of the electrolyte in a secondary battery of FIG. 1.
Figure 3:
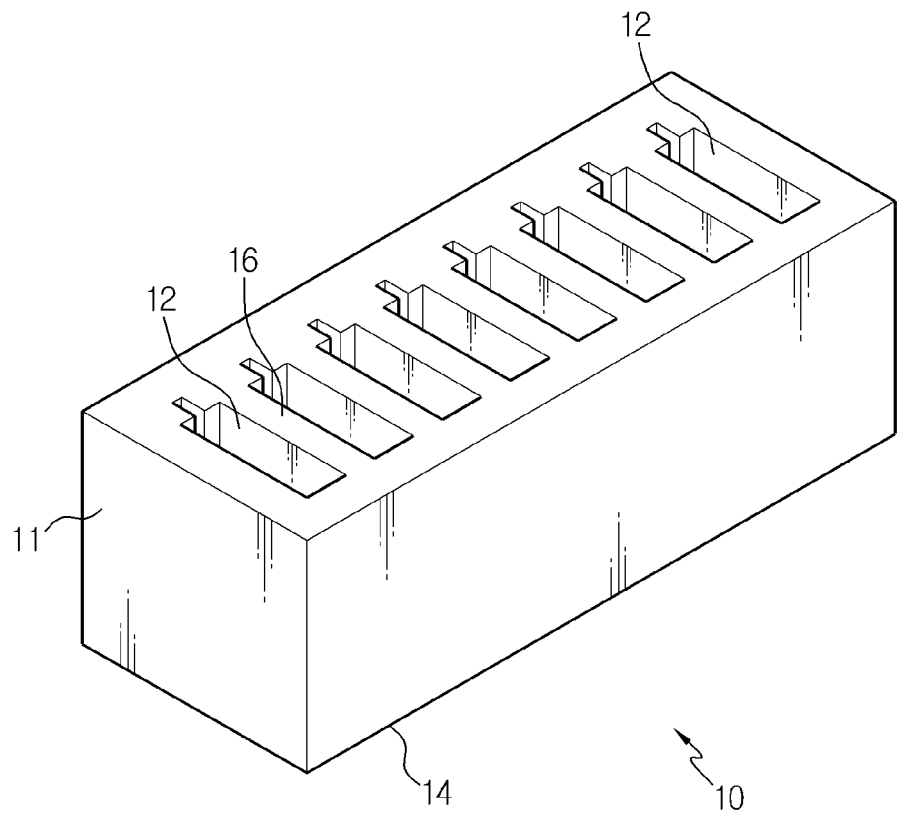
FIG. 3 is a perspective view schematically showing essential parts of a tray according to a preferred embodiment of the present invention.

FIG. 1 is a sectional view schematically showing an apparatus for enhancing impregnation of the electrolyte in a secondary battery according to a first embodiment of the present invention, FIG. 2 is a cross-sectional view schematically showing an apparatus for enhancing impregnation of the electrolyte in a secondary battery of FIG. 1, and FIG. 3 is a perspective view schematically showing essential parts of a tray according to a preferred embodiment of the present invention.

Referring to FIGS. 1 to 3, the apparatus 100 for enhancing impregnation of the electrolyte in a secondary battery according to the first embodiment of the present invention includes a tray 10 in which a plurality of battery cells 1 are received, and an oscillation and rotation unit 30 capable of making the tray 10 oscillate and rotate.

The tray 10 has a receiving space in which at least one battery cell 1, each having an electrode assembly, may be arranged. The tray 10 may be disposed in a chamber 20, explained later. The tray 10 includes a tray body 11 having a base 14 and partitions 16, and a tray cover 13 for covering the top of the tray body 11. The base 14 is formed by a substantially flat plate shape to form the receiving space 12 of the tray 10. The partitions 16 are used for receiving a plurality of battery cells 1 in one row or multiple rows. The partitions 16 are installed to be substantially perpendicular to the base 14. Preferably, the tray 10 is made entirely of metal material with excellent thermal conductivity. However, in the receiving space 12, a portion (not shown) of the tray 10 contacts a tap or lead of each battery cell 1. This portion is preferably replaced with non-metal material (for example, reinforced plastic or the like) so as to prevent a short circuit with the tap or lead.

The battery cell 1 is equipped with an electrode assembly and a circuit means therefor. Also, the battery cell 1 is sealed after the electrolyte is injected therein. In other words, after the battery cell 1 is filled with the electrolyte by using a separate electrolyte injection device (not shown), the battery cell 1 is sealed. Then, in the apparatus 100 for enhancing impregnation of the electrolyte in a secondary battery according to this embodiment, each battery cell 1 is received in the tray 10, and then the tray 10 oscillates and rotates to increase the impregnation rate of the electrolyte injected into the battery cell 1.

The electrode assembly included in the battery cell 1 has a structure in which a cathode plate, a separator, and an anode plate are subsequently disposed. The cathode plate, the separator, and the anode plate are arranged at least more than once. The cathode plate is produced by coating a cathode current collector having an aluminum foil shape with a cathode active material such as lithium cobalt oxide and then drying and compressing it. The anode plate is produced by coating an anode current collector having a copper foil shape with anode active material such as carbon-based active material and then drying and compressing it. The electrode assembly may have a so-called jelly-roll shape in which roll-shaped cathode and anode plates are wound into a spiral pattern with a roll-shaped separator being interposed between the cathode and anode plates. Or else, the electrode assembly may have a stacking shape in which a cathode plate, a separator, and an anode plate are subsequently stacked with predetermined size. In other words, it should be understood that the electrode assembly may have any shape well known in the art.

The oscillation and rotation unit 30 includes a chamber 20 to which the tray 10 may be mounted, an oscillation member 40 installed to the chamber 20 so that the tray 10 oscillates with a predetermined oscillation frequency, and a rotation member 50 for rotating the chamber 20 with a predetermined number of rotations.

The chamber 20 has a cylindrical shaped case 22, and a plurality of plates 24 installed to the case 22 to ensure a sufficient inner space so that the tray 10 may freely oscillate therein. In other words, the inner space formed in the chamber 20 by the plates 24 is sufficiently spaced apart from the tray 10 so that the tray 10 does not interfere with the plates 24 while oscillating by the oscillation member 40. The case 22 is a framework configuring a cylindrical appearance of the chamber 20. The plates 24 are similar in shape to the appearance of the tray 10 inside the case 22, but have a greater size. Also, the chamber 20 includes a body 21 having an opening (not shown) through which the tray 10 may move into or out of the chamber 20, and a cover 23 coupled to the body 21 to cover the opening. Here, the cover 23 is preferably hinged to the body 21 in order to selectively open or close the opening of the body 21. For this purpose, one end of the cover 23 is coupled to the body 21 by a hinge 25, and the other end of the cover 23 is selectively coupled to the body 21 by a hook 27.

The oscillation member 40 makes the tray 10 located in the chamber 20 oscillate with a predetermined oscillation frequency. The oscillation member 40 has a plurality of oscillators 42a and 42b installed to the chamber 20. The oscillators 42a and 42b are composed of horizontal oscillators 42a installed to side plates 24a disposed at both sides of the chamber 20 and vertical oscillators 42b respectively installed to a bottom plate 24b disposed to the chamber 20 and a cover plate 24c forming the cover 23. At least one pair of horizontal and vertical oscillators 42a and 42b is arranged. At least one pair of oscillators 42a and 42b may be operated cooperatively or independently to make the tray 10 oscillate.

Each of the oscillators 42a and 42b includes a driver for generating a rotating force, an oscillation generating unit driven by the driver to generate oscillations with reverse-phased frequencies, and a spring for amplifying the oscillations with the certain frequency generated from the oscillation generating unit and transmitting the amplified oscillations to an object subject to the oscillation, namely tray 10, as well known in the art. For convenience, this embodiment is illustrated on the assumption that drivers are installed to the plates 24a, 24b and 24c of the chamber 20 respectively, and springs are disposed at the insides of the plates 24a, 24b and 24c, respectively. Also, a contact plate 26 that may come into contact with the tray 10 is installed at the end of each spring. This contact plate 26 is inserted into a groove (not shown) formed in the outer wall of the tray 10 so that the tray 10 may be fixed at its place when being mounted in the chamber 20.

Meanwhile, it is obvious to those having ordinary skill in the art that the oscillation member 40 may further include other kinds of oscillation devices already known or to be known in the art, such as shakers, which functions similarly to the oscillators 42a and 42b, in addition to the oscillators 42a and 42b. Also, a person having ordinary skill in the art may change locations, number and operating patterns of the oscillators 42a and 42b installed in the chamber 20. In addition, it has been illustrated in this embodiment that one pair of oscillators 42a and 42b is disposed at each of both sides based on the tray 10 or each of the upper and lower surfaces. However, it is also possible that the tray 10 is fixed to any one of the right and left sides of the chamber 20, any one of the front and rear sides of the chamber 20, or any one of the upper and lower sides of the chamber 20, and only one of the oscillators 42a and 42b is installed to the other one of the sides of the chamber 20.

The rotation member 50 rotates the chamber 20 while the tray 10 is mounted in the chamber 20, so that the tray 10 may rotate. The rotation member 50 includes a rotary shaft 52 installed to both ends of the chamber 20, a pair of support frames 54 for supporting the rotary shaft 52, and a driving source 56 for rotating the rotary shaft 52 with a predetermined number of rotations. The driving source 56 has a motor (e.g., a step motor or a servo motor), which may give clockwise and counterclockwise rotations. Thus, it is obvious to those having ordinary skill in the art that a rotating speed given by the driving source 56 may be controlled as desired, even though the driving source 56 may give constant rotation.ABearings 58 having predetermined reduction ratios are provided between the driving source 56 and the rotary shaft 52. However, in a case where the driving source 56 has a geared motor, the driving source may be directly connected to the rotary shaft 52, as obvious to those having ordinary skill in the art. The rotary shaft 52 is supported by the support frames 54 via bearings 51.

Figure 4:
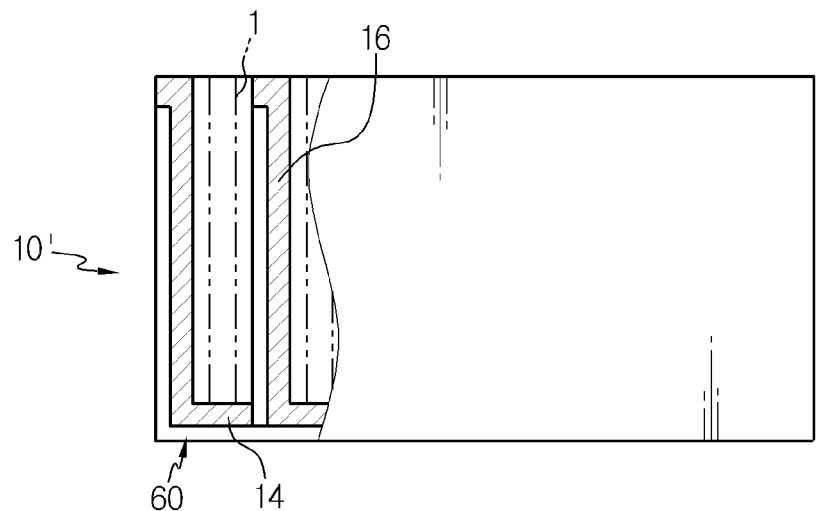
FIG. 4 is a partially sectioned view showing a modified example of the tray, which is adoptable to the apparatus for enhancing impregnation of the electrolyte in a secondary battery according to the present invention.

FIG. 4 is a partially sectioned view showing a modified example of the tray, which is adoptable to the apparatus for enhancing impregnation of the electrolyte in a secondary battery according to the present invention. In FIG. 4, like reference numerals denote like elements having like functions, compared with FIG. 3.

Referring to FIG. 4, an improved tray 10' includes a heating member 60 for keeping or controlling battery cells 1 received in the tray 10' within a predetermined temperature range in order to further increase an impregnation rate of the electrolyte injected into the battery cells 1.

The heating member 60 may be heating wires or heating rods installed to the base 14 and the partitions 16. Insert grooves (not shown) are formed in the base 14 and the partitions 16 in order to install the heating member 60 therein. Also, it is possible to divide the tray 10 into two parts and interpose the heating member 60 having the heating wires or the heating rods between the two parts of the tray 10. Material and structure of the heating member 60 are selected so that the heating member 60 may be kept or controlled within a temperature range between about 40° C. and about 60° C. Also, it is preferred that a control unit (not shown) is used for driving the heating member 60 and controlling the temperature of the heating member 60.

Hereinafter, operations of the apparatus 100 for enhancing impregnation of the electrolyte in a secondary battery according to the first embodiment of the present invention will be described as follows.

First, a plurality of battery cells 1 is received in the tray 10. The cover 23 of the chamber 20 is opened, and the tray 10 is inserted into the chamber 20 through the opening. After the tray 10 is placed in the chamber 20, the cover 23 is closed.

Subsequently, if the oscillation and rotation unit 30 is operated, the oscillation member 40 drives the oscillators 42a and 42b, and the oscillators 42a and 42b make the tray 10 oscillate in a horizontal and/or vertical direction. Due to the oscillation of the tray 10, the battery cells 1 received in the tray 10 oscillate so that the battery cells 1 may be impregnated with the electrolyte injected into the battery cells 1 at a relatively greater speed.

Meanwhile, the rotation member 50 may be operated at the same time the oscillation member 40 described above is operated. In other case, the oscillation member 40 and the rotation member 50 may be operated selectively. If the rotation member 50 is operated, the driving source 56 is operated to rotate the rotary shaft 52 at a predetermined speed. Accordingly, the chamber 20 is rotated, and thus the tray 10 disposed in the chamber 20 is rotated based on the rotary shaft 52 horizontally disposed. Here, the chamber 20 may be rotated continuously or intermittently. Also, the chamber 20 may rotate less than 360°. Even when the chamber 20 keeps rotating by the rotation member 50 as mentioned above, the battery cells 1 received in the tray oscillate by means of the oscillation member 40. Also, due to the rotation of the chamber 20 by the rotation member 50 and due to the resultant rotation of the tray 10, an impregnation ratio of the electrolyte injected into the battery cells 1 may be increased regardless of self weight or oscillation by the oscillation member 40.

Finally, after sufficient time passes, the operation of the oscillation and rotation unit 30 is stopped. Also, the cover 23 of the chamber 20 is opened, and the tray 10 is separated from the chamber 20 through the opening. This process may be included in an aging process for the battery cells 1 or may be performed before the aging process. After the aging process, a final fusing work or the like is performed to the battery cells 1.

Figure 5:
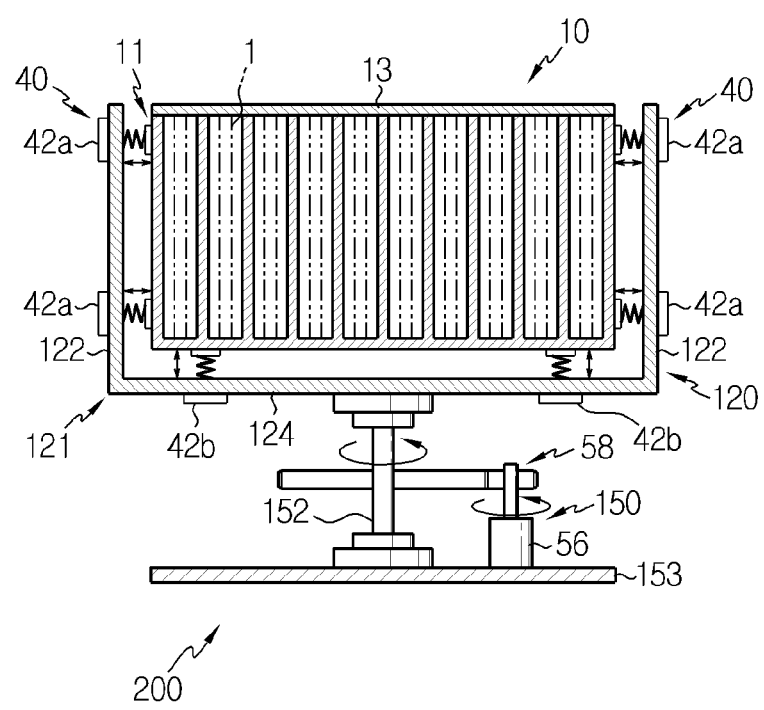
FIG. 5 is a sectional view schematically showing an apparatus for enhancing impregnation of the electrolyte in a secondary battery according to a second embodiment of the present invention.

FIG. 5 is a sectional view schematically showing an apparatus for enhancing impregnation of the electrolyte in a secondary battery according to a second embodiment of the present invention. In FIG. 5, like reference numerals denote like elements having like functions, compared with FIGS. 1 to 3.

The apparatus 200 for enhancing impregnation of the electrolyte in a secondary battery according to this embodiment has a chamber 120 for receiving the tray 10, and the chamber 120 has a rectangular parallelepiped shape, though the chamber of the former embodiment has a cylindrical shape. Also, a rotation member 150 is installed to the lower side of the rectangular parallelepiped chamber 120 to rotate the chamber 120.

The chamber 120 of this embodiment has a substantially rectangular parallelepiped body 121 with an open upper portion so as to ensure a sufficient space in which the tray 10 may be received. The body 121 is configured so that a plurality of panels or plates is interconnected with each other. The upper portion of the body 121 is opened to form an open end so that the tray 10 may come into or out of the body 121 through the open end.

The rotation member 150 of this embodiment includes a rotary shaft 152 installed to the bottom surface of the chamber 120, and a driving source 56 installed to a horizontal frame 153 to rotate the rotary shaft 152. In other words, the rotary shaft 152, installed between the bottom surface 124 of the chamber 120 and the horizontal plate 153, can be rotated by bearings (not shown).

Meanwhile, in this embodiment, the oscillation member 40 includes a horizontal oscillator 46a and a vertical oscillator 46b, where the horizontal oscillator 46a is installed to both sides 122 of the chamber 120 respectively, while the vertical oscillator 46b is installed only to the bottom surface 124 of the chamber 120.

According to this embodiment, the tray 10 is received in the rectangular parallelepiped chamber 120 in an open state, and the rotation member 150 located below the chamber 120 rotates the chamber 120 in a horizontal direction. Thus, the tray 10 mounted in the chamber 120 rotates in a horizontal direction, and the battery cells 1 received in the tray 10 also rotate in a horizontal direction. Simultaneously, the battery cells 1 oscillate by the oscillation member 40. In this way, an impregnation rate of the electrolyte injected in the battery cells 1 may be increased.

The apparatus 200 of this embodiment is operated in a similar way to that of the first embodiment. However, the chamber 140 rotates on a horizontal plane due to the horizontal rotation of the rotation member 150, differently from the first embodiment.

In other modified embodiments not illustrated, it would be obvious to those of ordinary skill in the art that the oscillation member and the rotation member employed in the apparatus for enhancing impregnation of the electrolyte according to the present invention may be configured as one integrated unit, not as individual components. In other words, one oscillation and rotation shaft capable of oscillating and rotating simultaneously may be provided below the chamber where the tray is received. If the chamber is fixed to one end of the oscillation and rotation shaft, the chamber may oscillate and rotate in a predetermined pattern in accordance with the oscillating and rotating trajectory of the oscillation and rotation shaft. In this case, the oscillation and rotation shaft may have a double-shaft structure so that it may increase or decrease its length while oscillating and rotating.

The above description and accompanying drawings illustrate preferred embodiments of the present invention, and it should be understood that various additions, modifications, combinations and/or substitutes can be made without departing from the spirit and scope of the invention, as defined in the appended claims. In particular, it would be understood by those of ordinary skill in the art that the present invention may be implemented with different specific shapes, structures, arrangements, or ratios by using other elements, materials, and components within the scope of the invention. It would also be understood by those of ordinary skill in the art that the present invention can be used with many modifications of structures, arrangements, ratios, materials, and components to be particularly suitable for specific environments or operation conditions within the principle of the invention. Also, the features described in the specification can be used solely or in combination with other features. For example, any features described in relation with one embodiment may be used together with and/or as a substitute for other features described in another embodiment. Thus, the disclosed embodiments should be construed not to limit the invention but to illustrate the invention in all aspects, and the scope of the invention is defined in the appended claims and not limited by the detailed description.

Any person having ordinary skill in the art would understand that various changes and modifications can be made to the invention within the scope of the invention. Some of such changes and modification are already discussed above, and the others will be apparent to those of ordinary skill in the art.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An apparatus for enhancing impregnation of the electrolyte in a secondary battery, comprising:
   a tray in which at least one battery cell is received; and
   an oscillation and rotation unit capable of oscillating and rotating the tray simultaneously,
   wherein the oscillation and rotation unit includes:
      a chamber to which the tray is mounted;
      an oscillation member installed to the chamber to oscillate the tray with a predetermined oscillation frequency; and a rotation member for rotating the chamber with a predetermined number of rotations,
wherein the oscillation member includes at least one oscillator installed to the chamber so that the at least one oscillator adheres closely to the tray.

2. The apparatus for enhancing impregnation of the electrolyte in a secondary battery according to claim 1, wherein the chamber includes:
a body having an opening through which the tray moves into or out of the body; and
a cover coupled to the body to cover the opening.

3. The apparatus for enhancing impregnation of the electrolyte in a secondary battery according to claim 2, further comprising:
a hinge for coupling one end of the cover to the body; and
a hook for selectively coupling the other end of the cover to the body.

4. The apparatus for enhancing impregnation of the electrolyte in a secondary battery according to claim 2, wherein the chamber includes:
a cylindrical case; and
a plurality of plates installed to the case to ensure a space for the tray to oscillate.

5. The apparatus for enhancing impregnation of the electrolyte in a secondary battery according to claim 1, wherein the chamber includes a substantially rectangular parallelepiped body for receiving the tray so as to ensure a space for the tray to oscillate.

6. The apparatus for enhancing impregnation of the electrolyte in a secondary battery according to claim 2, wherein the rotation member includes:
a rotary shaft installed to both ends of the chamber;
a support frame for supporting the rotary shaft; and
a driving source for rotating the rotary shaft.

7. The apparatus for enhancing impregnation of the electrolyte in a secondary battery according to claim 5, wherein the rotation member includes:
a rotary shaft installed to a bottom surface of the chamber; and
a driving source for rotating the rotary shaft.

8. The apparatus for enhancing impregnation of the electrolyte in a secondary battery according to claim 6, wherein the driving source has a step motor capable of giving clockwise and counterclockwise rotations.

9. The apparatus for enhancing impregnation of the electrolyte in a secondary battery according to claim 1, wherein the tray further includes a tray cover for fixing the battery cells.

10. The apparatus for enhancing impregnation of the electrolyte in a secondary battery according to claim 1, further comprising a heating member installed to the tray.

11. The apparatus for enhancing impregnation of the electrolyte in a secondary battery according to claim 10, wherein the heating member includes a plurality of heating wires installed to a base and/or partitions of the tray.

12. The apparatus for enhancing impregnation of the electrolyte in a secondary battery according to claim 10, wherein the heating member is heated to a temperature ranging from about 40° C. to about 60° C.

13. A method for enhancing impregnation of the electrolyte in a secondary battery, comprising:
(a) receiving at least one battery cell, which is sealed after the electrolyte is injected therein, in a tray;
(b) receiving the tray in a chamber that is capable of oscillating and rotating;
(c) rotating the chamber with a predetermined number of rotations and oscillating the chamber with a predetermined oscillation frequency simultaneously; and
(d) heating the tray in advance to a predetermined temperature range.

14. The method for enhancing impregnation of the electrolyte in a secondary battery according to claim 13, wherein, in the step (c), a rotating direction of the chamber is changeable between clockwise and counterclockwise directions, and a rotating speed of the chamber is controllable.

15. The method for enhancing impregnation of the electrolyte in a secondary battery according to claim 13, wherein, in the step (c), the chamber is oscillated in horizontal and vertical directions.

16. A secondary battery, produced in accordance with the method defined in claim 13.

17. The apparatus for enhancing impregnation of the electrolyte in a secondary battery according to claim 1, wherein the tray is suspended in the chamber by springs.

18. The apparatus for enhancing impregnation of the electrolyte in a secondary battery according to claim 17, wherein the chamber includes sidewalls, and
wherein the springs are located between the tray and a pair of opposed chamber sidewalls.

19. The apparatus for enhancing impregnation of the electrolyte in a secondary battery according to claim 18, wherein the chamber includes three pairs of opposed sidewalls, and
wherein the springs are located between the tray and the three pair of opposed chamber sidewalls.

* * * * *